United States Patent [19]
Sato et al.

[11] 3,863,172
[45] Jan. 28, 1975

[54] COMMON-MODE REJECTION AMPLIFYING SYSTEM
[75] Inventors: Makoto Sato, Hatboro; Roy F. Schmoock, Ivyland, both of Pa.
[73] Assignee: Fischer & Porter Co., Warminster, Pa.
[22] Filed: Jan. 19, 1970
[21] Appl. No.: 3,907

[52] U.S. Cl. .................. 330/69, 330/1 A, 73/194, 330/103
[51] Int. Cl. ............................................. H03f 1/00
[58] Field of Search ...................... 330/30 D, 69, 1 A

[56] References Cited
UNITED STATES PATENTS
3,516,005  6/1970  Brown, Jr. .......................... 330/69
3,516,006  6/1970  Donjon .............................. 330/69

Primary Examiner—Nathan Kaufman

[57] ABSTRACT

An amplifying system responsive to a compound signal having a signal component and a common-mode noise component, the system acting to effect proportional amplification of the signal component and to reject the noise component. The system includes two differential amplifiers each having first and second inputs, and a single output which is coupled by a negative feedback impedance to the second input. The compound signal is applied between the first inputs of the two amplifiers while the output of the second amplifier is applied to the second input of the first amplifier through a coupling impedance, the impedance parameters of the system being such as to cause cancellation of the noise component and proportional amplification of the signal component in the first amplifier.

3 Claims, 1 Drawing Figure

Patented Jan. 28, 1975
3,863,172
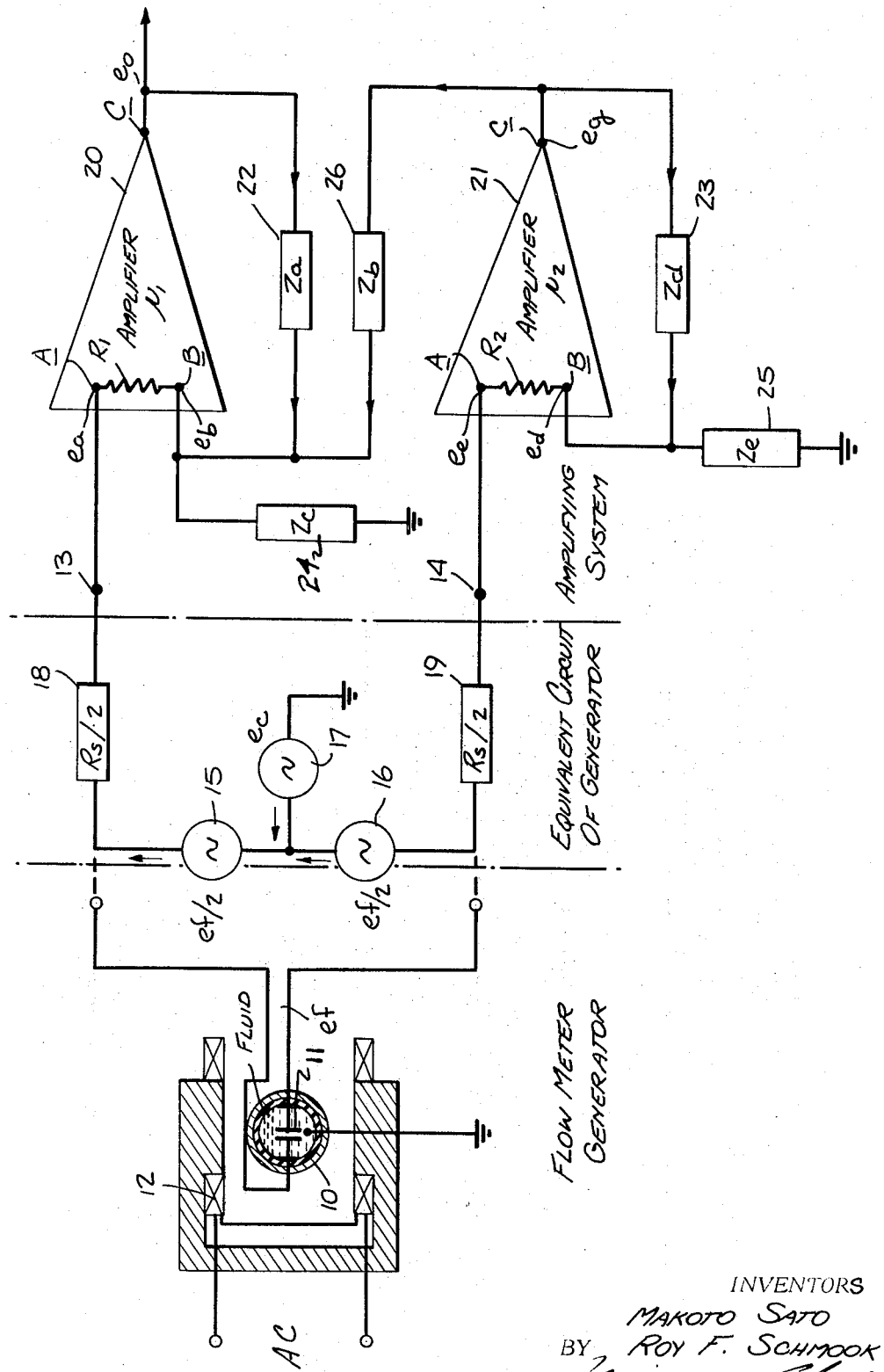
INVENTORS
MAKOTO SATO
BY ROY F. SCHMOOK
ATTORNEY

_3,863,172_

COMMON-MODE REJECTION AMPLIFYING SYSTEM

BACKGROUND OF INVENTION

This invention relates generally to signal amplifying systems, and more particularly to a common-mode rejection circuit for a differential amplifier which is adapted to reject signals common to both inputs thereof.

An important feature of many types of differential amplifiers or comparators is their ability to discriminate against signals common to both inputs. For example, one might have a low-frequency A-C signal riding on a D-C level, the compound signal being applied to one input while the same fixed bias is applied to the other input. Care must be taken to minimize the response of the amplifier to the common D-C level. Where the signal to be rejected is D-C in nature, circuits are available to effect such rejection without unduly complicating the system and without using transformers for this purpose.

But in applications in which the common-mode component is also alternating in nature, it becomes more difficult to carry out common-mode rejection. This is particularly true in the case of electromagnetic flowmeters of the type disclosed in U.S. Pat. No. 3,260,109 and 3,254,243, wherein the fluid to be measured flows through a conduit and is subjected therein to a magnetic field transverse to the direction of flow. The magnetic field is created by an electromagnet excited by a standard 60-cycle A-C power line. Electrodes in contact with the fluid flowing through the conduit are arranged on a transverse line which is perpendicular both to the direction of flow and the magnetic field. The flow induces an A-C signal through the electrodes which is substantially proportional to flow rate.

The signal derived from the electrodes of the electromagnetic flow meter usually contains a large amount of common-mode A-C noise whose amplitude is larger than the signal reflecting flow rate. Moreover, the source impedance of the flowmeter varies with fluid conductivity. In order, therefore, to convert the flow signal to an amplified output which accurately represents flow rate, it is necessary to have a high impedance input and to incorporate common-mode rejection in the amplifying system.

To this end, the conventional arrangement used in conjunction with the primary of electromagnetic flowmeters employs two transformers to effect common-mode rejection, the first transformer serving to apply the signal and noise components to the second transformer in a manner effecting cancellation of the noise but summation of the signal fed by the second transformer to the input of an amplifier. Among the drawbacks of this arrangement are that low-level, 60-cycle signal transformers are relatively expensive and in any event, are prone to pick up magnetic noise. Furthermore, the impedance of the transformer, as seen by the flowmeter, is relatively low.

SUMMARY OF INVENTION

In view of the foregoing, it is the primary object of the invention to provide an amplifying system responsive to a compound voltage for effecting proportional amplification of the signal component while rejecting the noise component.

An important advantage of the invention is that it dispenses with transformers of the type heretofore used to effect common-mode rejection in the context of magnetic flow-meter amplification and hence makes possible a low-cost, efficient and compact system.

A more specific object of the invention is to provide a system of the above type, which includes two differential amplifiers each having first and second inputs and a single output, the compound input signal being applied to the first inputs of the two amplifiers and the output of the second amplifier being applied to the second input of the first amplifier, whereby the noise component is effectively cancelled in the first amplifier which functions to proportionately amplify only the signal component.

A significant feature of the system is that each amplifier includes a negative feedback impedance coupling the output thereof to the second input, whereby the linearity of the system is maintained and the input impedance thereof is enhanced.

Briefly stated, these objects are attained in an amplifying system including two differential amplifiers, each having first and second inputs and a single output, the output being connected through a negative feedback impedance to the second input. The compound input signal is applied between the first inputs of the two amplifiers, the second inputs being connected to bias impedances. The output of the second amplifier is connected through a coupling impedance to the second input of the first amplifier so that the voltage applied to the inputs of the first amplifier is constituted by the signal component of the compound signal in summing relationship, and by the noise component in subtractive relationship, the impedance parameters of the system being such as to cause cancellation of the noise component in the first amplifier and porportional amplification of the signal component.

OUTLINE OF DRAWING

For a better understanding of the invention, as well as other objects and further features thereof, reference is made to the following detailed description to be read in conjunction with the accompanying drawing, wherein the single FIGURE shows in block diagram an amplifying system in accordance with the invention.

DETAILED DESCRIPTION OF INVENTION

Referring now to the drawing, for purposes of illustration only, the invention will be described as it operates in conjunction with the primary of an electromagnetic flowmeter which generates an alternating-current signal having a large A-C noise component. It is to be understood, however, that the invention is applicable to any compound signal source requiring common-mode rejection.

In the primary of a magnetic flowmeter, the fluid, whose flow rate is to be measured, is conducted through a tube 10. At diametrically opposed points in tube 10 are mounted electrodes 11 which are exposed to the fluid in the tube, the electrodes being insulated from the wall of the tube. The liner or wall of the tube must be an insulating sleeve or of nonconductive material.

An alternating magnetic field is established which extends at right angles both to the axis of the tube and the common axis of electrodes 11. This field is produced by an electromagnet whose field coil 12 is connected to an alternating-current line. As is well known, the flow of fluid through the tube induces an A-C voltage across the electrodes which is substantially proportional to flow rate. This signal appears at terminals 13 and 14.

The signal $ef$, which depends on flow rate, is represented in the drawing by A-C generators 15 and 16, each producing one half of the signal. Thus generator 15 yields $ef/2$ and generator 16 yields $ef/2$. The common-mode noise component $e_c$ is represented by generator 17. The source impedance $R_s$, which varies with the conductivity of the fluid through flow tube 10, is divided equally between signal generators 15 and 16 and is represented by impedances 18 and 19, each having a value $R_s/2$.

The amplifying system for the magnetic flowmeter primary includes two differential amplifiers 20 and 21 whose first and second input terminals are designated A and B, and whose single output terminal, by letter C. The gains of these amplifiers are represented by symbols $U_1$ and $U_2$. Resistor $R_1$ represents the input impedance across the input terminals of amplifier 20, and resistor $R_2$, that across the input terminals of amplifier 21. Negative feedback between output terminal C and input terminal B of amplifier 20 is effected through an impedance 22 whose value is $Za$, while negative feedback between output terminal C and input terminal B of amplifier 21 is effected through an impedance 23 whose value is $Zd$. In practice, the impedances are provided by suitable resistance-capacitance networks.

Bias is applied to input terminal B of amplifier 20 by way of an impedance 24 whose value is $Zc$, while bias is applied to input terminal B of amplifier 21 by way of an impedance 25 whose value is $Ze$. The output of amplifier 20 at terminal C is the output of the system, and is represented by signal voltage $eo$, whereas the output of amplifier 21 at terminal C represented by voltage $eg$, is applied through coupling impedance 26, whose value is $Zb$, to input B of amplifier 20.

In practice, the two amplifiers and the associated impedances may be formed in a highly compact integrated circuit so that the space requirements for the system are very small as compared to the transformers heretofore used for the same purpose.

It will be evident that the compound voltage applied between input terminals A and B of amplifier 20 includes the algebraic sum of signals $e/f_2$ and $e/f_2$ produced by serially-connected generators 15 and 16, for one end of the series generator circuit goes to terminal A of amplifier 20, whereas the other end goes through amplifier 21 to terminal B of amplifier 20. The compound voltage applied between input terminals A and B of amplifier 20 also includes the algebraic difference between noise voltage component $e_c$ as applied in the same polarity to both terminals A and B of amplifier 20, the noise voltage being applied to terminal B through amplifier 21. The circuit parameters are made such as to effect cancellation or rejection of the common-mode noise.

To obtain this effect, the following relationship must exist with respect to the impedances associated with amplifiers 20 and 21:

$$1/Za + 1/Zc - Zd/ZbZe = 0$$

The derivation of this equation will now be explained.

Let us, at the outset, assume that the gain of amplifiers 20 and 21 is infinity, and that input polarity is chosen to effect negative feedback. From this assumption, it is evident that in order to have finite output of the amplifiers, the input of the amplifiers must be zero, that is, $$e_a = e_b, e_e = e_d.$$

This also means that current running through resistors $R_1$ and $R_2$ and through impedances $R_s/2$ (18 and 19), is zero. Therefore, $$e_a = e_c + e_f/2 = e_b \quad (1)$$

$$e_e = e_c - e_f/2 = e_d \quad (2)$$

Continuity of current at feedback input leads to:

$$(e_o - e_b/Z_a) + (e_g - e_b/Z_b) = e_b/Z_c \quad (3)$$

$$(e_g - e_d/Z_d) = (e_d/Z_e) \quad (4)$$

From equation (3):

$$e_b(1/Z_a + 1/Z_b + 1/Z_c) = e_o/Z_a + e_g/Z_b \quad e_b = e_o/Z_a + e_g/Z_b/1/Z_a + 1/Z_b + 1/Z_c \quad (5)$$

From equation (4):

$$e_d(1/Z_d + 1/Z_e) - e_g/Z_d \quad e_d = e_g/Z_d/1/Z_d + 1/Z_e \quad (6)$$

Substitute equation (5) to (1):

$$e_c + e_{f/2} = e_o/Z_a + e_g/Z_b/1/Z_a + 1/Z_b + 1/Z_c \quad (e_c + e_{f/2})(1/Z_a + 1/Z_b + 1/Z_c) = e_o/Z_a + e_g/Z_b \quad (7)$$

Substitute equation (6) to (2):

$$e_c - e_{f/2} = e_g/Z_d/1/Z_d + 1/Z_e \quad (e_c - e_{f/2})(1/Z_d + 1/Z_e)Z_d = e_g \quad (8)$$

Substitute equation (8) to (7):

$$(e_c + e_{f/2})(1/Z_a + 1/Z_b + 1/Z_c) = e_o/Z_a + Z_d/Z_b (e_c - e_{f/2})(1/Z_d + 1/Z_e)$$

Factor out $e_c$ and $e_f$:

$$e_c Z_a (1/Z_a + 1/Z_c - Z_d/Z_bZ_e) + e_f Z_a/2 (1/Z_a + 2/Z_b + 1/Z_c + Z_d/Z_bZ_e) = e_o \quad e_o = e_c Z_a(1/Z_a + 1/Z_c - Z_d/Z_bZ_e) + e_f Z_a (1/2Z_a + 1/Z_b + 1/2Z_c + Z_d/2Z_bZ_e) \quad (9)$$

Equation (9) indicates that if we make $(1/Z_a + 1/Z_c - Z_d/Z_bZ_e) = 0$, the common mode voltage $e_c$ goes out and the amplifier rejects common mode signal. Notice that we can make the condition even if either $Z_a$ or $Z_b$ is infinity.

In an actual embodiment of the invention, the following impedance values were chosen:

$Z_a = 100K$ ohm $Z_b = Z_d = Z_e = 10K$ ohm

Therefore, with these specific impedance values $(1/Z_a + 1/Z_c - Z_d/Z_bZ_e) = 1/100,000 + 1/Z_c - 1/10,000 = 0$ $Z_c = 11.11K$ ohm The gain of the amplifier is:

$e_o/e_f = Z_a(1/2Z_a + 1/Z_b + 1/2Z_c + Z_d/2Z_bZ_e) = 100,000 (1/200,000 + 1/10,000 + 1/22,222 + 1/20,000) = 20$

While there has been shown and described a preferred embodiment of a common-mode rejection amplifying system in accordance with the invention, it will be appreciated that many changes and modifications may be made therein without, however, departing from the essential spirit of the invention.

We claim:

1. An amplifying system responsive to a compound signal having a signal component and a common-mode noise component, said compound signal being derived from the electrodes of an electromagnetic flowmeter having an A-C energized electromagnet to establish an electromagnetic field across a flow tube whereby said compound signal is induced in said electrodes as a function of flow rate, said system comprising:
   a. first and second differential amplifier circuits each having first and second inputs and a single output, said first and second amplifier circuits each including a negative feedback impedance connected between the output and the second input thereof,
   b. means including a coupling impedance to connect the output of the second circuit to the second input of the first circuit,
   c. means to apply the compound signal to the first inputs of the first and second circuits to cause the signal component to appear at the input of the first circuit in summing relationship and the noise component to appear in subtractive relationship, said first and second circuits having impedance parameters to effect amplification of the signal component and to effect rejection of the noise component in the first circuit, and
   d. means coupled to the single output of said first circuit and independent of the single output of said second circuit to derive therefrom the amplified signal component substantially free of said noise component.

2. A system as set forth in claim 1, wherein the values of said impedances are such as to cause said first amplifier to effect proportional amplification of the signal component and cancellation of the noise component.

3. A system as set forth in claim 1, wherein said impedances have values in accordance with the following equation, $$1/Z_a + 1/Z_c - Z_d/Z_bZ_e = 0,$$

where: $Z_a$ and $Z_d$ are the respective values of the feedback impedances in the first and second circuits, $Z_c$ and $Z_e$ are the respective values of the bias impedances, and $Z_b$ is the value of the coupling impedance.

* * * * *